(12) United States Patent
Lyon (10) Patent No.: US 8,548,194 B1
(45) Date of Patent: Oct. 1, 2013

(54) SYSTEM AND METHOD FOR DETERMINING ALTITUDE

(75) Inventor: Jeffery A. Lyon, Coppell, TX (US)

(73) Assignee: Mustang Tchnology Group, L.P., Plano, TX (US)

( * ) Notice: Subject to any disclaimer, the term of this patent is extended or adjusted under 35 U.S.C. 154(b) by 695 days.

(21) Appl. No.: 12/592,642

(22) Filed: Nov. 12, 2009

Related U.S. Application Data (60) Provisional application No. 61/199,417, filed on Nov. 12, 2008.

(51) Int. Cl.
*G05D 1/00* (2006.01)

(52) U.S. Cl.
USPC .............................................. 382/103; 701/4

(58) Field of Classification Search
None
See application file for complete search history.

(56) References Cited

U.S. PATENT DOCUMENTS

| | | | | |
|---|---|---|---|---|
| 3,710,388 A | * | 1/1973 | Banks | 342/158 |
| 5,485,384 A | * | 1/1996 | Falconnet | 701/445 |
| 5,684,935 A | * | 11/1997 | Demesa et al. | 345/419 |
| 6,222,479 B1 | * | 4/2001 | Honigsbaum | 342/13 |
| 6,295,021 B1 | * | 9/2001 | Lichten et al. | 342/355 |
| 6,640,165 B1 | * | 10/2003 | Hayward et al. | 701/4 |
| 7,395,156 B2 | * | 7/2008 | Chiou et al. | 701/301 |
| 7,792,330 B1 | * | 9/2010 | Lowder et al. | 382/106 |
| 2003/0146869 A1 | * | 8/2003 | Lin et al. | 342/357.14 |
| 2006/0293854 A1 | * | 12/2006 | Chiou et al. | 701/301 |
| 2009/0123083 A1 | * | 5/2009 | Kawase et al. | 382/254 |

OTHER PUBLICATIONS

Foster et al., "Three-Dimensional Aerodynamic Shape Optimization Using Genetic and Gradient Search Algorithms", Journal of Spacecraft and Rockets vol. 34, No. 1, Jan.-Feb. 1997, p. 36-42.*

* cited by examiner

*Primary Examiner* — Bhavesh Mehta
*Assistant Examiner* — Tahmina Ansari
(74) *Attorney, Agent, or Firm* — Anderson & Levine, LLP

(57) ABSTRACT

An altitude estimating system for use in a movable device, comprising: (i) circuitry for detecting, for each frame of a plurality of time frames, a set of present features external from the movable device; (ii) circuitry for providing, from a set of present features detected in a first frame, a set of predicted features that represent a prediction of location of the set of present features for a second frame that follows in time the first frame; (iii) circuitry for creating a set of correlated features by correlating a set of the predicted features for the second frame with a set of present features detected for the second frame; and (iv) circuitry for providing an estimated altitude in response to the set of correlated features.

22 Claims, 8 Drawing Sheets

SYSTEM AND METHOD FOR DETERMINING ALTITUDE

CROSS-REFERENCES TO RELATED APPLICATIONS

This application claims priority to, and entitlement of the filing date of, under 35 U.S.C. §119, U.S. Provisional Application No. 61/199,417, filed Nov. 12, 2008.

STATEMENT REGARDING FEDERALLY SPONSORED RESEARCH OR DEVELOPMENT

The invention was made by an agency of the United States Government or under a contract with an agency of the United States Government, with the contract number being UNIWAC FA8651-05-C-0115 awarded by the United States Air Force.

BACKGROUND OF THE INVENTION

The present embodiments relate to determining an altitude of an air traveling object in response to positional data and image data, where typically such data are determined by apparatus aboard the object.

In various applications including military applications, there is a need to estimate the altitude of an air traveling object, such as a vehicle, reconnaissance device, or weapon. Certain of such objects include a guidance system that includes apparatus for estimating attitude and position information, from which the system or a corresponding system, estimates altitude. One particular approach is described in U.S. patent application Ser. No. 11/540,263, filed Sep. 29, 2006, entitled, "System and method for determining range in response to image data," co-assigned to the same entity as is the present application, and incorporated herein by reference. In this incorporated application, a system is described that estimates range from an air traveling object to an object on the ground, and the system also may correspondingly estimate altitude of that air traveling object; in either case, the estimate (range or altitude) is determined in response to image data representing a separate object external from the air traveling object, where often the separate object is fixed relative to the ground. In any event, altitude estimates may be used for various applications, and certain of these applications are improved based on the accuracy of the altitude estimate. Therefore, while altitude estimates in the past have proven effective, typically an improvement in such estimates will necessarily improve any application based on the estimate. The present preferred embodiments, therefore, are directed to such improvements.

BRIEF SUMMARY OF THE INVENTION

In the preferred embodiment, there is an altitude estimating system for use in a movable device. The system comprises circuitry for detecting, for each frame of a plurality of time frames, a set of present features external from the movable device. The system further comprises circuitry for providing, from a set of present features detected in a first frame, a set of predicted features that represent a prediction of location of the set of present features for a second frame that follows in time the first frame. The system further comprises circuitry for creating a set of correlated features by correlating a set of the predicted features for the second frame with a set of present features detected for the second frame. Finally, the system also comprises circuitry for providing an estimated altitude in response to the set of correlated features.

Other aspects are also disclosed and claimed.

BRIEF DESCRIPTION OF THE SEVERAL VIEWS OF THE DRAWING

FIG. 4b illustrates features detected at a point in time $t_1$ subsequent to the point in time $t_0$ corresponding to FIG. 4a.

FIG. 4c again illustrates the features from time $t_1$ of FIG. 4b along with a set of predicted features that were determined based on the initial features of time $t_0$ of FIG. 4a.

FIG. 8b illustrates two cumulative distribution functions corresponding to the respective two probability density functions of FIG. 8a.

DETAILED DESCRIPTION OF THE INVENTION

The preferred embodiments are described below in connection with an example as implemented into an air flight vehicle such as an airplane, as the present inventor believes that the inventive scope is well understood in such applications. However, the invention also may be implemented in, and provide significant benefit to, other systems that benefit by determining an altitude of the air flight system. Accordingly, it is to be understood that the following description is provided by way of example only and is not intended to limit the inventive scope.

Figure 1:
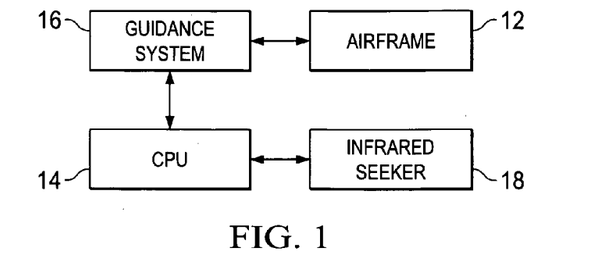
FIG. 1 illustrates a functional block diagram of a system 10 for determining altitude of an object passing through free space in accordance with a preferred embodiment.

FIG. 1 illustrates a functional block diagram of a system 10 for determining altitude of an object passing through free space, where such an object is identified in system 10 as an airframe 12. The general nature of each individual block of system 10 may be known to one skilled in the art, but novel aspects are added thereto in the collection, processing, and refinement of certain data as well as the altitude information that is thereby determined as a result and any physical system that relies on or is responsive to that altitude information. In addition to airframe 12, system 10 includes three block functions, namely, a central processing unit ("CPU") 14 and its related processor code, a guidance system 16, and an imaging sensor which, by way of example, is shown as an infrared seeker 18. Each of these items is now introduced here, with various additional aspects detailed throughout the remainder of this document.

CPU 14 is illustrated to represent the common combination of a processor and its related devices, input/output, circuitry, and programming code for providing instructions to, and receiving processing results from, such a processor. CPU 14 therefore may be any one (or more) of many different commercial computational processors, and often such processors that are more task specific are referred to DSPs. Further, CPU 14, or some other computational processor used as processor 14 may include internal memory as well as an interface(s) to external memory and other peripherals, which are not shown to simplify the Figure but are well known in the computing art. The processor code of, or associated with, CPU 14 may include code to cause CPU 14 to perform numerous known operations relative to system 10 that are not detailed herein, but in addition and per the preferred embodiments as detailed below, the processor code directs CPU 14 to perform methodologies that determine from guidance system 16 data and infrared seeker 18 data an altitude estimate of airframe 12 that has an associated probability density function (PDF) and cumulative distribution function (CDF), where the estimated altitude is optimized in connection with one of alternative observations with respect to the CDF. Lastly, note that the processor code of CPU 14 may be written or created by one skilled in the art in numerous forms given the particular device and instruction set architecture of CPU 14 and the methodology detailed below.

Guidance system 16 includes apparatus for determining attributes such as positioning (i.e., attitude and location), and may further determine heading, orientation, speed, and acceleration of system 10, such as relative to the Earth and based on one or more measures. For example, guidance system 16 may include sufficient apparatus for determining location in response to the Global Positioning System ("GPS"), and it also may include an Inertial Navigation System ("INS"). As is known in the art, GPS refers to a satellite-based radio positioning system that provides full-time three-dimensional location, velocity, and time information that may be received by a GPS receiver that is in a location that receives the GPS signal, such as included in guidance system 16 in this case. In response to this information, the GPS receiver equipped device may determine its location, with some level of error, relative to the Earth. INS, also sometimes referred to as Inertial Reference System, typically includes gyroscopes and other electronic tracking systems that detect acceleration and deceleration to thereby compute a system (e.g., aircraft) location in latitude and longitude. Guidance system 16 also may include hardware and software for performing various computations to determine the attributes discussed above as well as to take further action in response to those attributes, including, as its name suggest, the guidance of airframe 12 (i.e., the entirety of system 10). Moreover, as further appreciated with the knowledge provided from the remainder of this document, guidance system 16 and/or airframe 12, as enhanced with a more accurately determined altitude determination by CPU 14, may exploit that information for use in apparatus to accomplish various applications, where such apparatus is assumed for sake of this document to be a par of airframe 12 and to include, but not be limited to, any one or more of altimetry, collision avoidance, navigation, automatic landing, three-dimensional (3-D) imaging, targeting, and similar applications, where such apparatus is ascertainable by one skilled in the art and is thereby enhanced with a more accurate estimated altitude in response to which it may operate. Lastly, guidance system 16 is bi-directionally coupled to CPU 14 and it is also coupled to receive information from infrared seeker 18.

Infrared seeker 18 may be one (or more) of known or ascertainable sensors for capturing data representative of images of objects external from system 10. For example, infrared seeker 18 may be implemented as an infrared camera or sensor, a passive infrared sensor ("PIR"), a forward looking infrared ("FLIR") sensor, a visible spectrum camera, or various other imagery sensors. Typically the image data is in the form of picture element, or pixel, data, where as known in the art each pixel represents data at a point perceived by the sensor and the combination of the pixels combine to form an image that is perceived by seeker 18 and for which each pixel may have a defined coordinate in an image plane. Also in this regard, seeker 18 may be constructed in various manners and may include numerous individual sensing elements. In any event, seeker 18 provides its image data to CPU 14 and guidance system 16. Note that in the preferred embodiment the connection of image data to guidance system 16 is optional and is known in the art, where guidance system 16 may use that data for various purposes such as target location and tracking. The connection of image data from seeker 18 to CPU 14 permits CPU 14 to perform an inventive methodology for estimating altitude of system 10, in response in part to data captured by seeker 18 as detailed below. Lastly, gimbal angles of seeker 18 are also reported to guidance system 16 and/or CPU 14 and may be used in connection with the methodologies detailed below.

Figure 2:
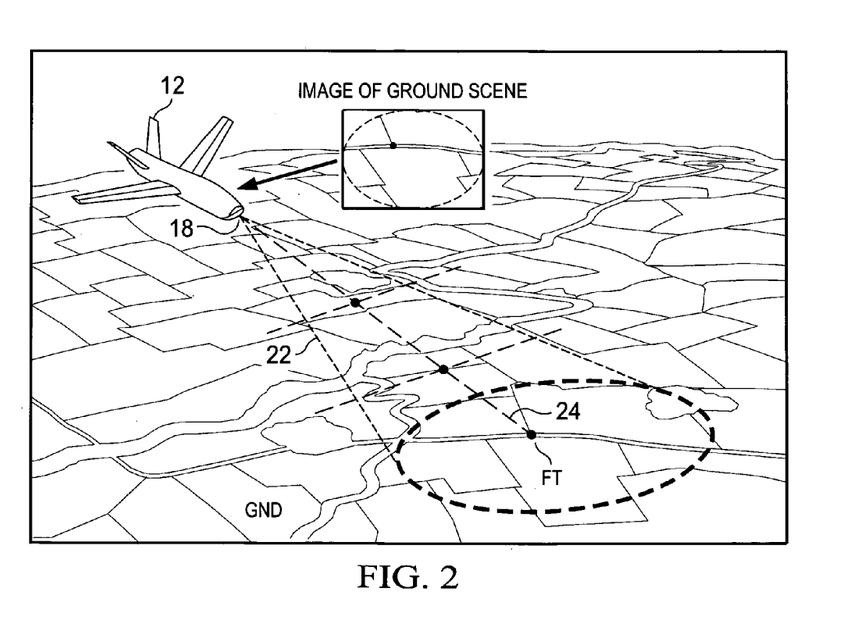
FIG. 2 illustrates an airframe 12 that encompasses system 10 of FIG. 1.

FIG. 2 illustrates airframe 12 of system 10 described above in connection with FIG. 1. This figure also provides a context and illustration of certain terms and aspects described later. In the example of FIG. 2, infrared seeker 18 is presumed to be at or near the front tip or lower portion of airframe 12 and has a field of view ("FOV") 22 extending in the direction of the ground GND. A boresight 24 extends through the center line of FOV 22, where FOV 22 therefore represents in general a cone about bore site 24. Thus, within that cone and likely at or near where that contacts ground GND, a feature FT or various features exist and are captured in the form of data by infrared seeker 18, and that data is provided to CPU 14 (and guidance system 16). Note that in the preferred embodiments data is repeatedly captured in this manner, at a frequency that may be selected by one skilled in the art and in respective time periods typically referred to as frames. In any event, however, from data collected at different times, system 10 in the preferred embodiments may determine or estimate an altitude of system 10. Indeed and by way of introduction to the preferred embodiments, using the available INS/GPS information and the preferably passively-obtained imagery, system 10 determines at points in time a respective position vector (range and direction) from system 10 to numerous items external from system 10, referred to herein as features, where the features are within FOV 22. For some or all of these range vectors, system 10 also determines at the points in time a corresponding estimated altitude, thereby providing a set of estimated altitude points that thereby present a corresponding PDF and CDF for the set. In one embodiment, system 10 estimates altitude as the median of that CDF. In another embodiment, system 10 further estimates altitude by creating different sets of estimated altitude points from correlated features, where each set again has a corresponding PDF and CDF for the set and desirably the process repeats until the PDF is sufficiently narrow and the CDF is sufficiently steep, thereby indicating as detailed below that a refined and more accurate altitude estimate has been obtained as that altitude that gave rise to the creation of the desirable PDF and corresponding CDF. For simplicity, this document assumes that these methodologies are used to derive an accurate altitude estimate by an air vehicle in level flight and equipped with an infrared imaging sensor. However, the methodology may be generalized and thereby also used in numerous other circumstances.

Figure 3:
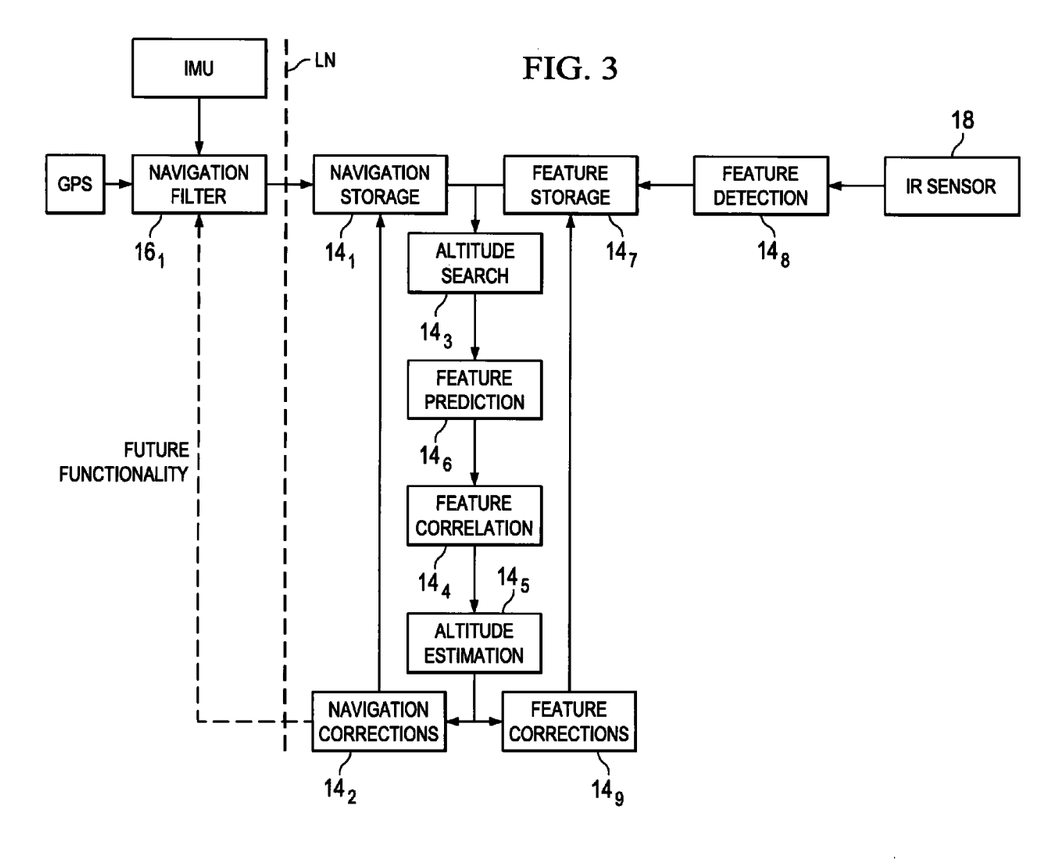
FIG. 3 illustrates a functional block diagram of various aspects of CPU 14 and guidance system 16 of FIG. 2.

FIG. 3 illustrates a functional block diagram of various aspects of CPU 14 and guidance system 16 of FIG. 2, where specifically blocks to the right of line LN are functions associated with CPU 14 and blocks to the left of line LN are functions associated with guidance system 16. A navigation storage block $14_1$ logs inputs coming from a navigation filter $16_1$, where filter $16_1$ may receive various navigation parameters as discussed above as part of system 16 and shown by ways of example in FIG. 3 to include the Global Positioning System ("GPS") and an inertial measurement unit (i.e., a core part of the Inertial Navigation System (INS)). A navigation corrections block $14_2$ feeds updated information back to guidance system 16 and also may be modified with future functionality. An altitude search block $14_3$, as detailed below, operates in one embodiment in combination with various other blocks $14_x$ and is improved by the inventive scope, thereby improving the methodology of CPU 14 and system 10 as a whole to provide an altitude estimation in altitude estimation block $14_5$; by way of introduction, altitude search block $14_3$ performs a preferably iterative methodology to provide altitude estimates to a feature prediction block $14_6$. Feature prediction block $14_6$ uses airframe-related parameters (including the estimated altitude parameter) to predict where features found in previous image frames will appear in future frames. These predicted features are correlated by a feature correlation block $14_4$ with actual features as detailed below, where the actual features are detected by feature detection block $14_8$ in response to image data that is captured or detected by infrared seeker 18 (shown in FIG. 3 as an IR sensor 18) and stored in a feature storage block $14_7$ (e.g., memory). More specifically, features detected by infrared seeker 18 and to be tracked are sometimes referred to as "Harris Corner" points, as further detailed later. A feature corrections block $14_9$ updates, in response to the latest altitude update from altitude estimation block $14_5$, the spatial information to be stored in feature storage block $14_7$ for each feature.

FIGS. 4a through 4d illustrate various aspects relating to the methodology and process of feature correlation block $14_4$, where in general such a methodology is known in the art but it is also used as part of a preferred embodiment as detailed throughout this document. By way of introduction, the feature correlation methodology involves tracking features from frame to frame, that is, at different respective time periods, and features found in a current frame of data are related to features predicted (or propagated) forward from a previous frame or frames. Also as demonstrated herein, in preferred embodiments feature correlation is repeated in connection with improved iterative estimated altitudes used to predict new sets of predicted features for correlation to current features so as to converge on a desirably sufficient estimated altitude.

Figure 4A:
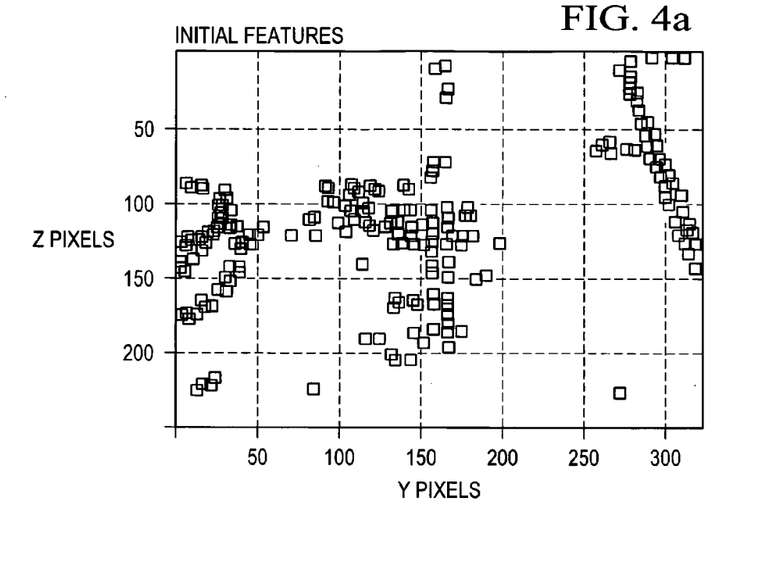
FIG. 4a illustrates features detected at some point in time $t_0$.

Turning more specifically to FIGS. 4a through 4d, FIG. 4a illustrates features (sometimes referred to as Harris Corner points, or Harris points) at some point in time, which for sake of reference is indicated as initial features and may for sake of reference may be associated with a time $t_0$. Additionally, recall that features are detected by infrared seeker 18 and feature detection block $14_8$ and, thus, the initial features of FIG. 4a are so detected.

Figure 4B:
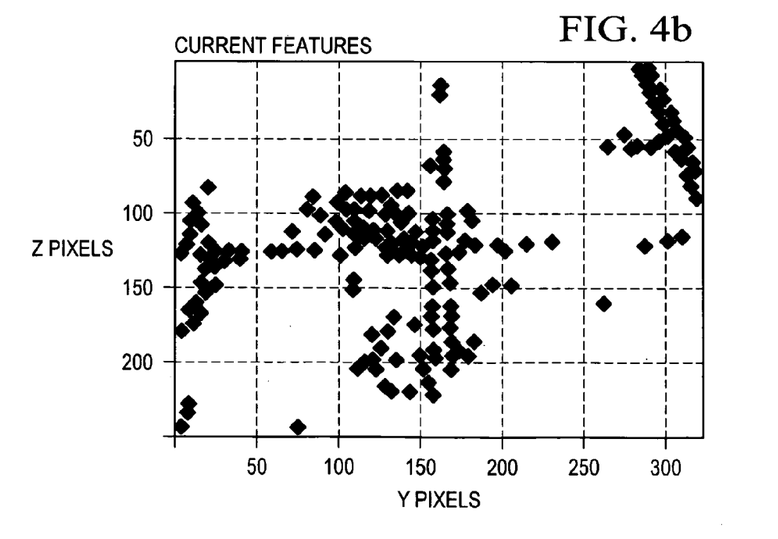
Figure 4C:
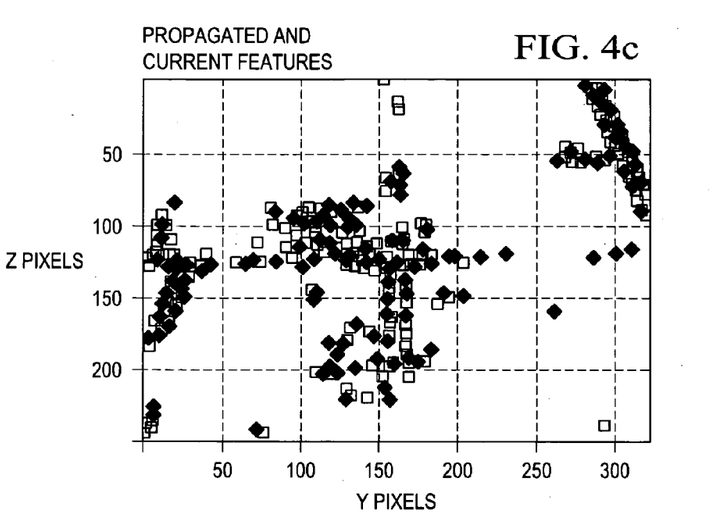

FIG. 4b illustrates the current or actual features (i.e., Harris points) detected from a frame of data subsequent to that shown in FIG. 4a, again as detected by infrared seeker 18 and feature detection block $14_8$. Thus, for sake of reference these features are shown as current features, as may be associated with a time $t_1$ that follows $t_0$.

In one aspect of the preferred embodiment, based on the set of features at one time, predictions are made by feature prediction block $14_6$ as to where those features would appear from the perspective of infrared seeker 18 in the future; in other words, for some or all of the actual features detected at a prior time, a set of corresponding predicted features are determined for a time corresponding to a subsequent image frame time. To illustrate this aspect, FIG. 4c again illustrates the current features from time $t_1$ of FIG. 4b on an infrared image, and superimposed with the current features is a set of predicted features that were determined based on the initial features of time $t_0$ of FIG. 4a. More particularly, in FIG. 4c the attitude and position information from guidance system 16, as well as either a detected or estimated altitude, are used to predict where in the current frame at time $t_1$ the initial features from time $t_0$ should appear; in other words, the initial features of FIG. 4a have been propagated forward to the current frame of FIG. 4c as predicted expected locations for those features given where system 10 is now located relative to the ground at the time of the current frame, and both those initial features and the predicted features from FIG. 4b are shown superimposed on the current image of FIG. 4c.

Figure 4D:
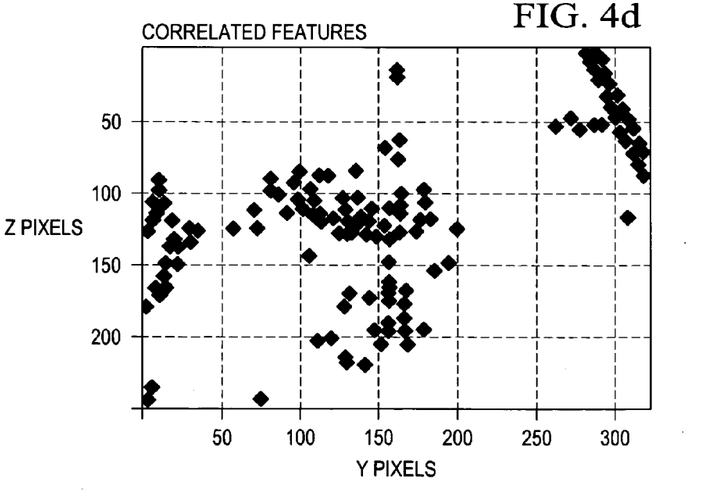
FIG. 4d illustrates the completion of feature correlation with respect to a set of predicted and current features.

FIG. 4d illustrates the completion of feature correlation with respect to a set of predicted features correlated with a set of current features, by a graphical depiction of those so-called "correlated" features corresponding to where correlations have been established between those two sets of features. Particularly, in this methodology correlations are established by linking or pairing each propagated feature (i.e., predicted based on the features of the frame of time $t_0$ in FIG. 4a) with a closest feature or features of the current frame (i.e., the actual features of the frame of time $t_1$ in FIG. 4b). In other words, the feature correlation analyzes some (or all) of the actual features in FIG. 4c and correlates each of those features with a closest propagated feature (or features) within a predefined correlation tolerance. Thus, the correlated features shown in FIG. 4d represent the result of the correlation, that is, each current feature from FIG. 4c that was paired to a predicted feature and therefore is designated in FIG. 4d as a correlated feature.

From the preceding, one skilled in the art should appreciate the frame-by-frame methodology wherein, for each frame in a series of multiple frames, a set of actual features is detected, a set of predicted features corresponding to the set of actual features is generated as to relate to a future frame, and a correlation is performed relating the actual features with the predicted features from an earlier frame to thereby establish a set of correlated features. In accordance with differing preferred embodiments, the frame-by-frame methodology additionally includes a step (or steps) of determining an estimated altitude from the correlated features, as is further explored below.

Returning briefly to FIG. 2, recall the FOV cone boresight 22 extends to the ground GND and to a feature FT at that point. In this regard, in a preferred embodiment one method of operation of system 10 (e.g., via CPU 14 as instructed by code) estimates altitude given various geometrical determinations based on the distance from infrared seeker 18 to a correlated feature, that is, by considering the correlated feature as the feature to which boresight 24 extends in FIG. 2a. Specifically, with that consideration, and from geometry with respect to infrared seeker 18 (and hence airframe 12), altitude is estimated. In certain respects, the geometric determinations are performed according to the method in the above-incorporated U.S. patent application Ser. No. 11/540,263, and the reader is invited to review that document for additional details. Certain of those details are summarized herein by way of context and from which one skilled in the art may better understand the preferred methodology.

Figure 5:
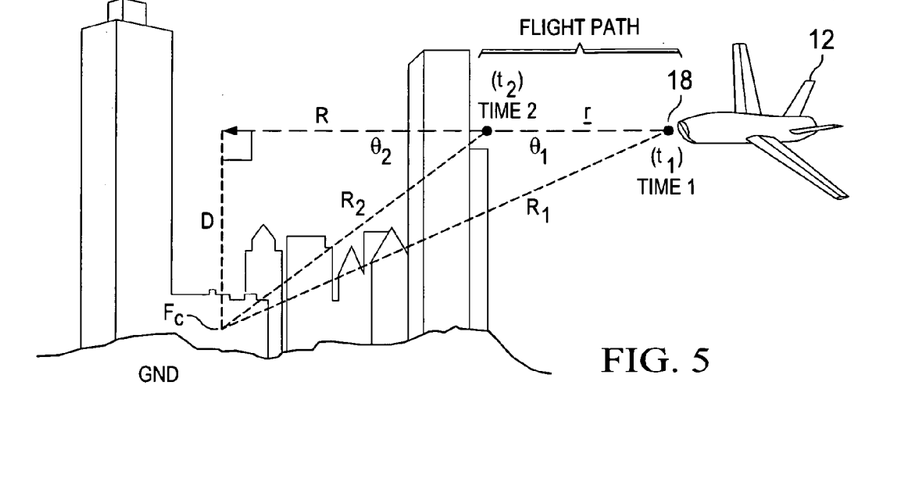
FIG. 5 illustrates airframe 12 passing over ground GND and various geometric measures including a boresight to a correlated feature.

FIG. 5 illustrates what is essentially also illustrated in FIG. 3 of the above-incorporated U.S. patent application Ser. No. 11/540,263, and again may be understood with respect to details provided in that application. In lesser detail, in FIG. 5 airframe 12 is shown passing over ground GND. While in FIG. 5 infrared seeker 18 may detect an actual feature along its boresight as described above, the feature in FIG. 5 is shown as a correlated feature $F_C$ as has been determined based on the above discussion wherein an actual feature is correlated to a predicted feature (or features) to result in a corresponding correlated feature $F_C$. Accordingly, as of time $t_1$ shown in FIG. 5, various geometric parameters may be observed, including a range $R_1$ from seeker 18 to correlated feature $F_C$ and a so-called look angle $\theta_1$, which is the angle between the flight path of seeker 18 (and airframe 12) and range $R_1$. Moreover, as airframe 12 and its seeker 18 continue along the flight path and at a point in time $t_2$, also existing is a range $R_2$ from seeker 18 to correlated feature $F_C$ and a look angle $\theta_2$, with airframe 12 having traveled a vector r (with a length donated r hereafter) between $t_1$ and $t_2$. Finally, a right triangle may be defined at time $t_2$ that, were airframe 12 to continue along its flight path, defines an additional distance R traveled and also a distance D that at that point would exist between airframe 12 and correlated feature $F_C$.

Given the preceding, the above-incorporated U.S. patent application Ser. No. 11/540,263 demonstrates an inventive methodology that determines a range $R_x$ (e.g., $R_1$ or $R_2$) to a feature within the FOV of seeker 18, and as used with the present preferred embodiments that feature may be a correlated feature $F_C$. In the incorporated patent application, it is shown in Equations 5 and 6 that the following relationships are determinable, re-stated herein as Equations 1 and 2:

$$R_1 = \sqrt{D^2 + (R+r)^2} \qquad \text{Equation 1}$$

$$R_2 = \sqrt{D^2 + R^2} \qquad \text{Equation 2}$$

Figure 6:
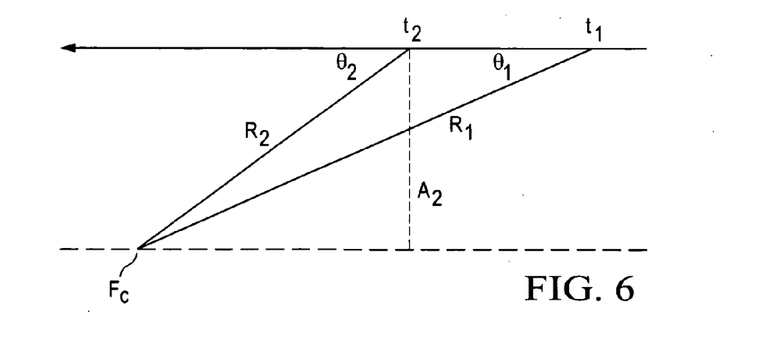
FIG. 6 illustrates various parameters of FIG. 5 in a simplified form to illustrate certain geometries.

Moreover, FIG. 6 of the present document illustrates these same parameters in a simplified form to illustrate only the geometries of FIG. 5. From this illustration, one skilled in the art will understand that a geometrically functional equivalent may be determined for Equation 2, that is, $R_2$ may be determined under the law of sines and given the look angle separation of $\theta_2 - \theta_1$, as shown in the following Equation 3:

$$\frac{r}{\sin(\theta_2 - \theta_1)} = \frac{R_2}{\sin\theta_1} \rightarrow R_2 = \frac{r * \sin\theta_1}{\sin(\theta_2 - \theta_1)} \qquad \text{Equation 3}$$

As an additional observation as relating to the preferred embodiments, FIG. 6 also illustrates an altitude $A_2$ of airframe 12 (not shown, but see FIG. 5) as of time $t_2$. Particularly, assuming that the flight path is horizontal, then altitude $A_2$ is readily observed by one skilled in the art as in the following Equation 4:

$$A_2 = R_2 * \sin\theta_2 \qquad \text{Equation 4}$$

Moreover, if the flight path is not horizontal, then an angle from the horizontal to $R_2$ may be defined as $\lambda$, in which case Equation 4 may be re-written in terms of this angle relative to the horizontal, regardless of whether the flight path itself is horizontal, as shown in the following Equation 5:

$$A_2 = R_2 * \sin\lambda \qquad \text{Equation 5}$$

Figure 7:
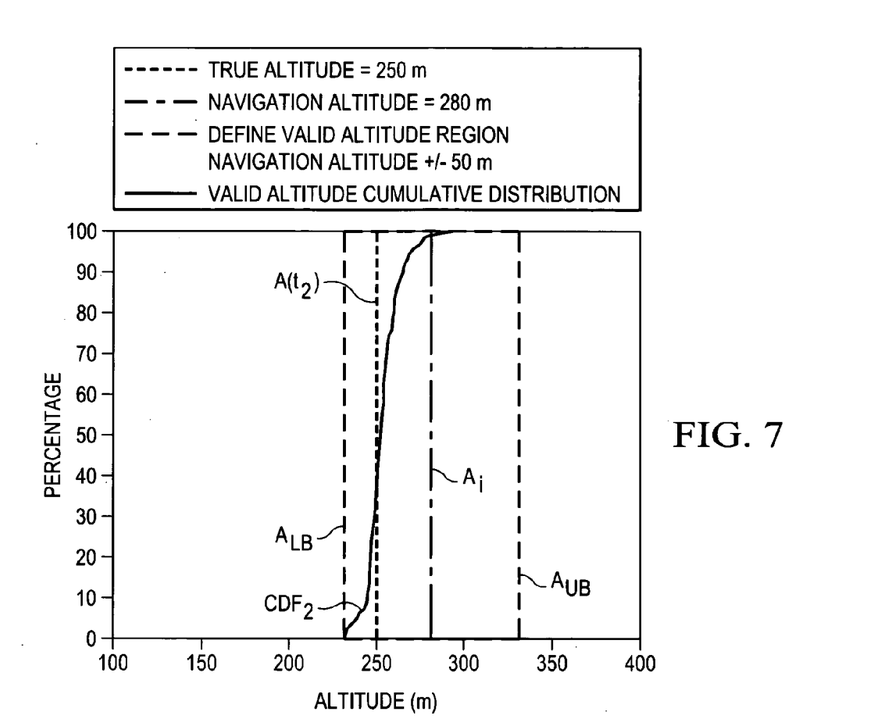
FIG. 7 illustrates a cumulative distribution function corresponding to a set of estimated altitude values.

Given the preceding, in one preferred embodiment system 10 estimates the altitude of airframe 12 in a number of steps. First, system 10 determines a number of values of altitude $A_x$ according to the above (e.g., Equation 5). In other words, for a given time $t_x$ with a corresponding frame of image data, recall that system 10 determines a set of correlated features. Thus, with respect to some or all of those correlated features in the set, system 10 also estimates a respective value of altitude $A_x$, thereby providing a set of estimated altitude values. Note also that the determination of the set of estimated altitude values is not constrained to the above-described equations, but may include other options including but not limited to the various additional approaches also described in the incorporated patent application (e.g., (1) with additional geometry at a point farther in time along the flight path; and (2) given an error sensitivity analysis using the small angle approximations, with or without a weighting). In any event, this set of estimated altitude values may be plotted as a cumulative distribution function CDF, as is shown by way of example, in FIG. 7. Specifically, FIG. 7 illustrates a cumulative distribution function $CDF_2$ to suggest that it corresponds to the set of estimated altitude values determined according to the preceding for a data frame at time $t_2$. In FIG. 7, altitude (e.g., in meters) is shown in the graph as the horizontal axis and percentage is shown in the graph as the vertical axis, where percentage indicates that along a CDF plot the total number of values along that plot are, at a given percentage, less than or equal to the value at the intersecting horizontal axis value. Further, in a preferred embodiment, system 10 identifies and improves the validity of the estimated altitudes CDF by removing the statistical outliers from $CDF_2$, where outliers may be defined based on engineering judgment, such as a number n of standard deviations. Therefore, FIG. 7 illustrates only those estimated values of altitude, at time $t_2$, once such outliers are so removed. Still further, in one or more embodiments, for the given time frame (e.g., at time $t_2$), system 10 determines the final estimated altitude $A(t_2)$ to be the median of those altitudes that remain in the CDF once the outliers are removed. Thus, in the example illustrated in FIG. 7, this final estimated altitude $A(t_2)$ is shown by the vertical line indicating an estimated altitude at 250 m. Lastly, note that FIG. 7 illustrates various other aspects that relate to an alternative preferred embodiment, as is further explored below.

Figure 8A:
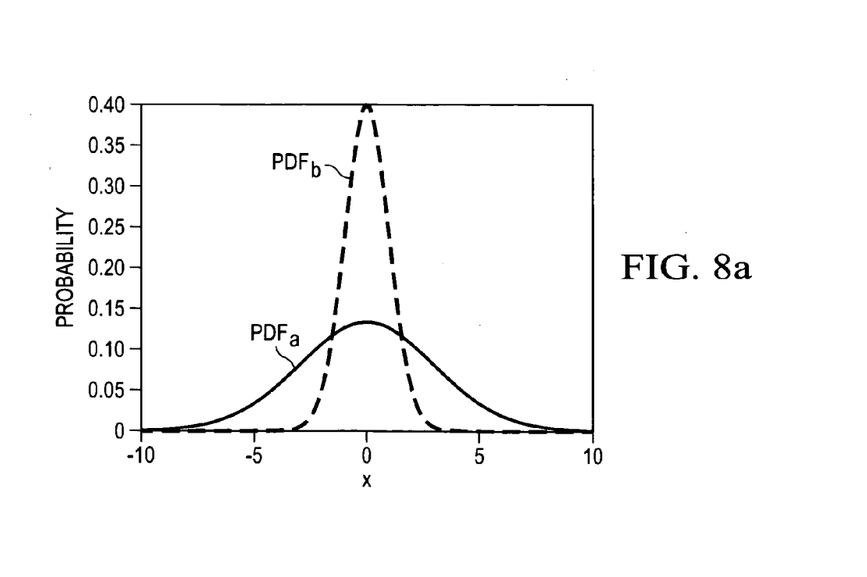
FIG. 8a illustrates two probability density functions with differing variance.
Figure 8B:
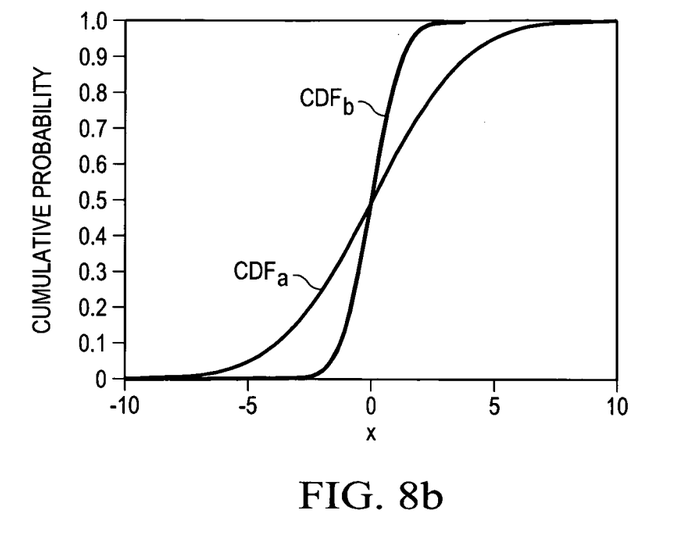

In an alternative preferred embodiment, the present inventor recognized that the final estimated altitude $A(t_x)$ at a frame of time $t_x$ may be further optimized by implementing an additional methodology to improve upon the data provided in the estimated altitude CDF and to thereby estimate altitude in an even more accurate manner. By way of explanation, the present inventor appreciated that a gaussian probability distribution function with a lower variance has a corresponding CDF that makes the transition from 0 to 1 in less time than one with a higher variance. This fact is demonstrated in FIGS. 8a and 8b. Specifically, FIG. 8a illustrates a first probability density function $PDF_a$ and a second $PDF_b$, and FIG. 8b illustrates the respective cumulative distribution function $CDF_a$ for $PDF_a$ of FIG. 8a and the respective cumulative distribution function $CDF_b$ for $PDF_b$ of FIG. 8a. In FIG. 8a, one skilled in the art may observe that $PDF_b$ arises from or has a low variance than does $PDF_a$. Looking then to FIG. 8b, one skilled in the art likewise may observe that $CDF_b$, corresponding to the lower-variance $PDF_b$, is steeper, that is, it makes the transition from 0 probability to 1 much more rapidly than does $CDF_a$, corresponding to the higher-variance $PDF_a$.

In a preferred embodiment, the present inventor implements a methodology that in effect provides an improved estimated altitude that may be appreciated based on the observations noted above in connection with FIGS. 8a and 8b. More specifically, in this preferred embodiment, system 10 performs additional method steps including an iterative process, wherein for each iteration a set of estimated altitudes corresponds again to a set of correlated features, where the set of estimated altitudes has a CDF steepness and the iterations thereby correspond to respective CDFs so as to converge on a CDF that is sufficiently steep and has a corresponding final estimated altitude that was used to derive the predicted features associated with that CDF. In other words, this preferred embodiment optimizes the steepness of a center section of the distribution curve to thereby optimize the final altitude estimate that corresponds to that curve, as further explored below. Lastly, note that steepness as used herein is defined not as the absolute maximum slope at any point in the transition, but as the rate at which the transition from low probability to high is achieved.

Figure 9:
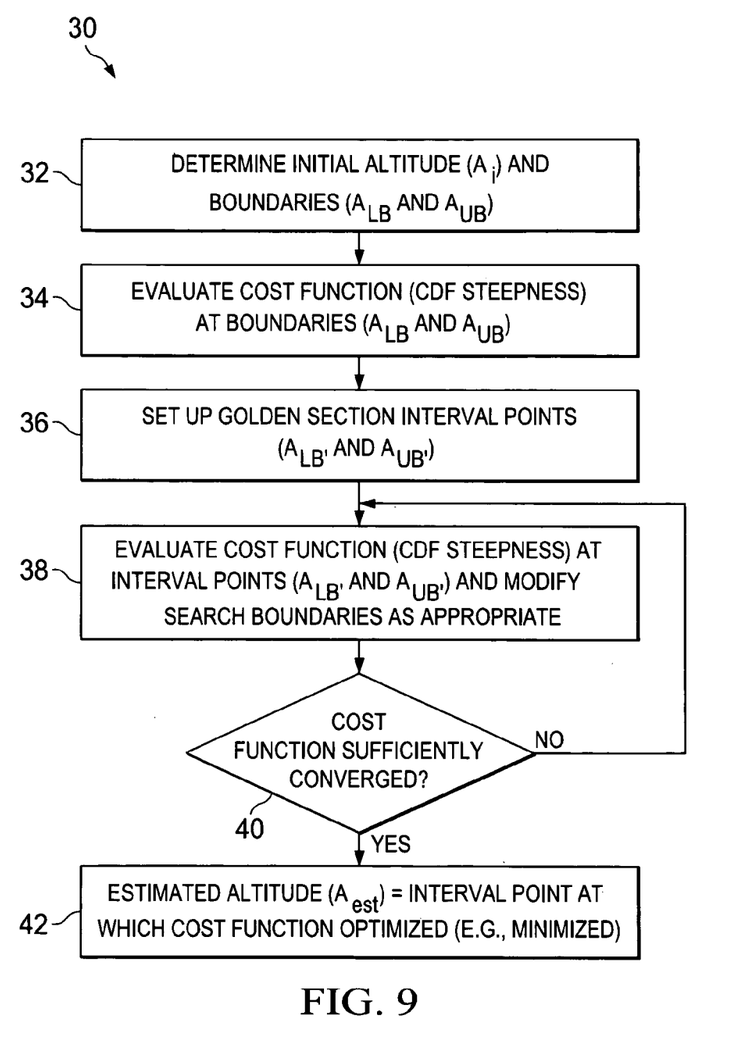
FIG. 9 illustrates a methodology 30 performed by system 10 to converge on an estimated altitude in response to a minimized cost function.

FIG. 9 illustrates a methodology 30 performed by system 10, where preferably processor code of CPU 14 instructs CPU 14 to perform the methodology. Method 30 commences with a step 32, where an initial estimated altitude $A_i$ is determined. The initial estimated altitude $A_i$ may be determined in various manners. In one example, $A_i$ may be determined by the above-described methodology, wherein a CDF is developed based on the correlated features in a frame that arise from its corresponding actual features and predicted features, where $A_i$ is then the median of the CDF. In an alternative embodiment, $A_i$ may be determined from guidance system 16. As an example of the latter, returning now to FIG. 7 it illustrates an example of $A_i$, where it is assumed that this value is provided by navigation apparatus included in guidance system 16. Thus, for sake of an example, assume therefore in FIG. 7 that $A_i$=280 m. Also in step 32, one or more criteria are used to set a lower altitude boundary $A_{LB}$ and an upper altitude boundary $A_{UB}$, where the initial estimated altitude $A_i$ is between these boundaries. These criteria may be selected by one skilled in the art. In one approach, a range of distance may be established, where the initial estimated altitude $A_i$ is centered within the range. To illustrate this approach, FIG. 7 illustrates a range of ±50 m, and, therefore, since $A_i$=280 m then $A_{LB}$=230 m and $A_{UB}$=330 m.

Methodology 30 continues from step 32 to step 34. In step 34, methodology 30 evaluates a cost function at boundaries $A_{LB}$ and $A_{UB}$, where as demonstrated below this evaluation commences a process to further optimize that cost function at other altitude values that are between the boundaries $A_{LB}$ and $A_{UB}$. In the preferred embodiment, the cost function determined is, consistent with the earlier teachings, a determination of CDF steepness that occurs when an altitude boundary value is used to generate corresponding predicted features and by correlating them with actual (or current) features to derive a corresponding set of correlated features (e.g., see FIGS. 4a-4d). In other words, therefore, in step 34, boundary $A_{LB}$ is used for a given time frame $t_x$ to generate a set of predicted features in response to that altitude and that will correspond to a subsequent time frame $t_{x+1}$. Then, the actual features at time frame $t_{x+1}$ are correlated with the predicted features from time frame $T_x$ to produce a corresponding set of correlated features relating to time frame $t_{x+1}$. Moreover, the above described geometrically-based methodology (e.g., see FIGS. 5 and 6) is then used to determine a respective altitude for each feature in a group of some or all of the correlated features, thereby providing a corresponding CDF for the group of resulting altitudes. For sake of reference, where the CDF corresponds to features predicted in response to boundary $A_{LB}$, then it is referred to as a $CDF_{LB}$; moreover, in the instance where the CDF relates to a time frame, then for sake of reference the time frame may be indicated in parenthesis so that the CDF for boundary $A_{LB}$ at time frame $t_{x+1}$ is referenced as $CDF_{LB}(t_{x+1})$. Given these conventions, and recalling that step 34 evaluates respective steepness as the cost function at both boundaries $A_{LB}$ and $A_{UB}$, then step 34 determines the steepness of both $CDF_{LB}(t_{x+1})$ and $CDF_{UB}(t_{x+1})$. Therefore, for sake of reference, the respective steepness determinations are referred to using a similar convention but with the variable "S", yielding $S_{LB}(t_{x+1})$ and $S_{UB}(t_{x+1})$, respectively.

Methodology 30 continues from step 34 to step 36. In step 36, methodology 30 begins to narrow the function evaluation region between boundaries $A_{UB}$ and $A_{LB}$ so as to ultimately converge on an optimized estimated altitude, as will be understood from the remaining discussion. In a preferred embodiment, this narrowing and optimization is performed according to the known Golden Section Search, as is known in the relevant art applicable thereto. Thus, while one skilled in that art should be familiar with such a search, certain details are presented herein for sake of providing other readers a sufficient understanding of the inventive scope. To further describe the Golden Section Search, FIG. 10 generically illustrates that search given various points $(X_n)$ where a corresponding function $(f_n)$ is determined, and as detailed below in the present preferred embodiment each point $(X_n)$ may be considered a given estimated altitude $A_i$ (or boundary altitude value) for which a CDF is determined as described above and where each function $(f_n)$ is the steepness S of that CDF, or its reciprocal, as explained below. Looking then at both FIGS. 9 and 10, in step 36 of FIG. 9 methodology 30 sets up golden section interval points $A_{UB'}$ and $A_{LB'}$ between the altitude boundaries $A_{UB}$ and $A_{LB}$. Note that the optimal spacing between region points is the so-called golden ratio, shown in the following Equation 6, and which therefore gives the convergence routine its name:

$$\varphi = \frac{1+\sqrt{5}}{2} = 1.618033989 \qquad \text{Equation 6}$$

Figure 10:
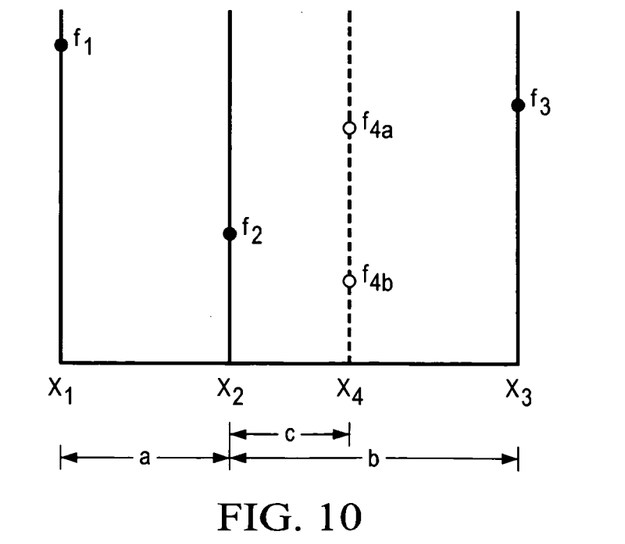
FIG. 10 generically illustrates values relating to an understanding of the Golden Section Search algorithm.

As correspondingly and generically indicated in FIG. 10, outer boundaries $X_1$ and $X_3$ (i.e., corresponding to $A_{LB}$ and $A_{UB}$, respectively) are shown, and then interval points $X_2$ and $X_4$ between those boundaries are established in step 36 (i.e., corresponding to $A_{LB'}$ and $A_{UB'}$, respectively). As demonstrated below, these within-the-boundary points permit an assessment of the function (i.e., $(f_n)$ as steepness S) at those points to continue to convergence on an optimized altitude value.

Methodology 30 continues from step 36 to step 38. In step 38, methodology 30 evaluates the cost function at the step 36 interval points and also modifies the search boundaries as follows. First, to illustrate the cost evaluation of step 36, FIG. 10 generically demonstrates that methodology 30 determines $f(X_2)$ and $f(X_4)$, or in the context of the application to system 10 and for time frame $t_{x+1}$ then methodology 30 determines steepness measures $S_{LB}(t_{x+1})$ and $S_{UB}(t_{x+1})$. At this point, therefore, a total of four cost function values are provided, that is, the steepness measures of $S_{LB}(t_{x+1})$, $S_{UB}(t_{x+1})$, $S_{LB'}(t_{x+1})$, and $S_{UB'}(t_{x+1})$. Also in step 38, a potential modification is made to one of the outer boundaries of the search region if the function realized between those outer boundaries is further minimized. Particularly per the Gold Search methodology one of the within-the-boundary function values (e.g., $S_{UB}(t_{x+1})$) is compared to the other three function values. As demonstrated in FIG. 10, if the new function value is $f_{4a}$, greater than $f_2$ but less than $f_3$, then section interval point $X_3$ is discarded as a boundary and $X_4$, corresponding to the value of $f_{4a}$ greater than $f_2$ but less than $f_3$, is deemed the new outer right boundary, that is, it becomes the rightmost boundary in the illustration of FIG. 10. In other words, this would result in a new triple of points $X_1$, $X_2$, and $X_4$, with the outer boundaries being $X_1$ and $X_4$, to be used for additional convergence analyses since the minimum function $f(X_4)$ clearly falls between $f(X_1)$ and $f(X_4)$. However, if evaluating the function at $X_4$ results in $f_{4b}$, which is less than $f_2$ and $f_1$, then $X_1$ is discarded as a boundary and $X_2$, corresponding to value of $f_{4b}$ that is less than $f_2$ and $f_1$, is deemed the new outer left boundary, that is, it becomes the leftmost boundary in the illustration of FIG. 10. In other words, this would result in a new triple of points $X_2$, $X_4$, and $X_3$, with the outer boundaries being $X_2$ and $X_3$, to be used for additional convergence analyses since the minimum function $f(X_4)$ clearly falls between $f(X_2)$ and $f(X_3)$. Lastly, recall from earlier that the present inventor has recognized that a larger or maximum steepness achieves a more accurate estimated altitude prediction, while note with respect to the present discussion that methodology 30 converges on a minimal function. Accordingly, the function of methodology 30 may relate to the reciprocal of CDF steepness, such that by identifying the minimum function value of the reciprocal, there is correspondingly identified the maximum steepness.

Finally in FIG. 9, methodology 30 is shown to repeat with a decision step 40 and a conclusion step 42. This is illustrated in that step 40 determines whether the cost function of the reciprocal of steepness has sufficiently converged to a sufficient low value or minimum. If step 40 has not sufficiently converged, method 30 returns to step 38 to continue the analysis as described above, that is, to again evaluate the function at another point and further bring the outer boundaries closer together. Eventually, therefore, step 40 should indeed converge at a sufficiently narrowed range of points and corresponding to a sufficiently minimized cost value of the steepness reciprocal, at which point method 30 concludes in step 42. Particularly, in step 40 the final estimated altitude, $A_{est}$, for the present time frame (e.g., $t_{x+1}$), is the altitude corresponding to that interval point at which the cost function was minimized. Thus, one skilled in the art should now appreciate that the search region is successively narrowed until convergence is achieved at a sufficiently minimal point.

From the above, one skilled in the art should now appreciate that the preferred embodiment methodology 30 includes a search algorithm methodology that tests a plurality of altitudes in the neighborhood of an initial altitude estimate and retains the one that results in the steepest CDF. Once an altitude is determined as described in the above preferred embodiments, the preferred embodiments may be expanded further to include use of that determination in various manners. As one example, the determined altitude may be displayed, either in airframe 12 or communicated elsewhere for display. As another example, altitude may be used in combination with other values to improve other flight measures, including a preferred use in altimetry. As another example, range estimates to other objects can be derived for use in collision avoidance. As still another example, the positioning of airframe 12 may be estimated based on the estimated altitude. The preferred embodiments also may assist in navigation by helping an unmanned vehicle establish its position relative to known GPS waypoints. In cases where waypoints are unknown, the preferred embodiments can be used to help the vehicle keep track of its location if GPS is lost. This can be accomplished by constantly establishing relationships between the vehicle and points in the scene during times when GPS information is available. Then, for those times when GPS is lost, the position of the vehicle relative to those same points can be used to establish the absolute position of the vehicle relative to the last good GPS information. For automatic landing, the preferred embodiments may assist both with collision avoidance and with altimetry so that a vehicle can avoid obstructions and land safely on the ground.

From the preceding, it may be appreciated that the preferred embodiments provide apparatus and methodology for estimating an airframe altitude in response to image and positional data. In the preferred embodiment, the image data provided is captured with a passive device, thereby avoiding the use of active sensors as is implemented in the prior art. Note that a passive sensor of the type described herein may already be included in various systems aboard a vehicle and as a result the preferred embodiment may be incorporated without the need for an additional sensor and without the need of an active sensor. Thus, there is potential reduction in cost, size, weight and complexity, and as a result certain disadvantages of the prior art are successfully overcome. Moreover, the inventive scope has been shown to include various preferred embodiments. Each of the embodiments detects features and predicts features at time frame intervals, and in a given frame correlates the predicted features from an earlier frame with the current actual features detected in the given frame. Then an estimated altitude is determined at the given frame in response to the correlated features. In one embodiment, the estimated altitude is the median of the CDF of the correlated features. In another embodiment, the estimated altitude is that altitude which is used to predict features which, when correlated with subsequent actual features, provide correlated features having a set of corresponding estimated altitudes that provide a sufficiently minimal CDF steepness. In all events therefore, various alternatives have been provided according to preferred embodiments, and still others may be ascertained by one skilled in the art. Given the preceding, therefore, one skilled in the art should further appreciate that while the present embodiments have been described in detail, various substitutions, modifications or alterations could be made to the descriptions set forth above without departing from the inventive scope, as is defined by the following claims.

The invention claimed is:

1. An altitude estimating system for use in a movable device, comprising:
    circuitry for detecting, for each frame of a plurality of time frames, a set of present features external from the movable device;
    circuitry for providing, from a set of present features detected in a first frame, a set of predicted features that represent a prediction of location of the set of present features for a second frame that follows in time the first frame;
    circuitry for creating a set of correlated features by correlating a set of the predicted features for the second frame with a set of present features detected for the second frame; and
    circuitry for providing an estimated altitude in response to the set of correlated features.

2. The system of claim 1 wherein the circuitry for providing an estimated altitude provides the estimated altitude in response to a cumulative distribution function comprising a set of altitude values that corresponds to the set of correlated features.

3. The system of claim 1 wherein the circuitry for providing an estimated altitude provides the estimated altitude in response to a cumulative distribution function comprising a set of altitude values that corresponds to the set of correlated features, after outliers are removed from the cumulative distribution function.

4. The system of claim 1 wherein the circuitry for providing an estimated altitude provides the estimated altitude as a median of a cumulative distribution function comprising a set of altitude values that corresponds to the set of correlated features, after outliers are removed from the cumulative distribution function.

5. The system of claim 1:
wherein the circuitry for providing, from a set of present features detected in a first frame, a set of predicted features, is further for providing a plurality of sets of predicted features from the set of present features detected in the first frame, wherein each set of predicted features in the plurality of sets of predicted features is generated in response to a respective altitude value;
wherein the circuitry for creating a set of correlated features is for creating a plurality of sets of correlated features, wherein each set of correlated features in the plurality of sets of correlated features corresponds to a respective altitude value; and
further comprising circuitry for determining a cumulative distribution function for a plurality of altitude values corresponding to a set of correlated features; and
wherein the circuitry for providing an estimated altitude provides the estimated altitude as the respective altitude value that gave rise to the set of correlated features having a sufficiently large steepness in its respective cumulative distribution function.

6. The system of claim 5 wherein the circuitry for providing an estimated altitude provides the estimated altitude as the respective altitude value that gave rise to the set of correlated features having a maximum steepness in its respective cumulative distribution function as compared to steepness of each other cumulative distribution function corresponding to a considered set of correlated features.

7. The system of claim 5 wherein the plurality of altitude values comprises a plurality of geometrically-determined altitude values.

8. The system of claim 7: wherein the system travels along a flight path; and further comprising circuitry for determining each geometrically-determined altitude value in the plurality of geometrically-determined altitude values in response to an angle between the flight path and a boresight line to a corresponding one of the correlated features.

9. The system of claim 8 wherein the circuitry for determining each geometrically-determined altitude value is for determining each geometrically-determined altitude as a distance from the system along the boresight line to the corresponding one of the correlated features times the sine of the angle between the flight path and a boresight line.

10. The system of claim 5:
wherein the circuitry for providing a plurality of sets of predicted features from the set of present features detected in the first frame is for providing a first set of predicted features in response to a first respective altitude value and a second set of set of predicted features in response to a second respective altitude value.

11. The system of claim 10 wherein the first respective altitude value and the second respective altitude value are boundary values and are at an equal range from a navigation system provided altitude value.

12. The system of claim 10 wherein the first respective altitude value and the second respective altitude value are boundary values and are at an equal range from an altitude that represents a median of a cumulative distribution function comprising a set of altitude values that corresponds to the set of correlated features.

13. The system of claim 5 wherein the circuitry for providing an estimated altitude provides the estimated altitude as the respective altitude value that gave rise to the set of correlated features having a minimal reciprocal steepness in its respective cumulative distribution function.

14. The system of claim 13 wherein the circuitry for providing an estimated altitude provides the estimated altitude in response to a golden section search.

15. The system of claim 1 and further comprising an apparatus responsive to the circuitry for providing an estimated altitude, the apparatus selected from a set comprising altimetry apparatus, collision avoidance apparatus, navigation apparatus, automatic landing apparatus, three-dimensional imaging apparatus, and targeting apparatus.

16. The system of claim 1 wherein the circuitry for detecting a set of present features external from the movable device comprises an infrared sensor for detecting the features as image features.

17. A method of estimating altitude of a movable device, comprising:
detecting, for each frame of a plurality of time frames, a set of present features external from the movable device;
providing, from a set of present features detected in a first frame, a set of predicted features that represent a prediction of location of the set of present features for a second frame that follows in time the first frame;
creating a set of correlated features by correlating a set of the predicted features for the second frame with a set of present features detected for the second frame; and
providing an estimated altitude in response to the set of correlated features.

18. The method of claim 17 wherein the step of providing an estimated altitude provides the estimated altitude in response to a cumulative distribution function comprising a set of altitude values that corresponds to the set of correlated features.

19. The method of claim 17 wherein the step of providing an estimated altitude provides the estimated altitude in response to a cumulative distribution function comprising a set of altitude values that corresponds to the set of correlated features, after outliers are removed from the cumulative distribution function.

20. The method of claim 17 wherein the step of providing an estimated altitude provides the estimated altitude as a median of a cumulative distribution function comprising a set of altitude values that corresponds to the set of correlated features, after outliers are removed from the cumulative distribution function.

21. The method of claim 17:
wherein the step of providing, from a set of present features detected in a first frame, a set of predicted features, further provides a plurality of sets of predicted features from the set of present features detected in the first frame, wherein each set of predicted features in the plurality of sets of predicted features is generated in response to a respective altitude value;
wherein the step of creating a set of correlated features creates a plurality of sets of correlated features, wherein each set of correlated features in the plurality of sets of correlated features corresponds to a respective altitude value; and further comprising determining a cumulative distribution function for a plurality of altitude values corresponding to a set of correlated features; and wherein the step of providing an estimated altitude provides the estimated altitude as the respective altitude value that gave rise to the set of correlated features having a sufficiently large steepness in its respective cumulative distribution function.

22. The method of claim 17 and further comprising operating an apparatus responsive to the step of providing an estimated altitude, the apparatus selected from a set comprising altimetry apparatus, collision avoidance apparatus, navigation apparatus, automatic landing apparatus, three-dimensional imaging apparatus, and targeting apparatus.

* * * * *